DUPLEX TELEGRAPHY FREQUENCY STABILIZING SYSTEMS

Filed Nov. 15, 1965

Inventor
R. A. WILLIAMS
By Cameron, Kerkam & Sutton
Attorneys

Inventor
R. A. WILLIAMS
By Cameron, Kerkam & Sutton
Attorneys

United States Patent Office 3,424,864
Patented Jan. 28, 1969

3,424,864
DUPLEX TELEGRAPHY FREQUENCY STABILIZING SYSTEMS
Raymond Anthony Williams, Bracknell, England, assignor to Ferranti, Limited, Hollinwood, England, a company of Great Britain and Northern Ireland
Filed Nov. 15, 1965, Ser. No. 515,506
Claims priority, application Great Britain, Nov. 18, 1964, 47,038/64
U.S. Cl. 178—58 8 Claims
Int. Cl. H04l 7/00

ABSTRACT OF THE DISCLOSURE

A frequency stabilizing system for stabilizing the output frequency of each of a plurality of stations in which each station includes a fixed frequency source, a frequency changer and phase comparator in which the stations are interconnected such that the output frequency of any one station is determined by the output frequency of at least one other station.

In systems employing a plurality of separate frequency sources it is sometimes desirable that the frequency at each source should be the same as the frequency at the other sources. In digital data link networks, for example, it is desirable that each data centre should transmit digital data at the same rate and to achieve this it is necessary that the reference frequency at each data centre for controlling the rate at which the transmitter transmits data should be stabilised at the same frequency as all other data centres connected to the network. It is not possible to obtain a standard reference frequency directly by the use of separate frequency standards, such as crystal oscillators, at each data centre since it is not possible to adjust a plurality of frequency standards to an identical frequency. It is known to achieve a standard frequency of operation by transmitting a standard frequency from one data centre to all other data centres in the network and using the received frequency to control the transmitters at the other stations. This method, however, suffers from the disadvantage that the network depends for its operation upon the operation of the one data centre and a breakdown for any reason, such as an equipment fault or a breakdown in a transmission path, can interrupt the operation of the whole network.

It is an object of the present invention to provide a frequency stabilizing system in which a plurality of stations operate at a standard frequency and which does not rely for its operation upon the operation of a single station.

According to the present invention a frequency stabilizing system includes a plurality of stations each comprising a fixed frequency alternating current generator the output frequency of which is approximately equal to the output frequency of the generator at each other station, frequency changing means to which the output of said generator is applied and which gives an output frequency dependant on the frequency of the input from said generator and a further input, comparison means for giving an output proportional to the difference in phase between the output of said frequency changing means and the output of the frequency changing means of at least one other of said stations, the output of said comparison means being applied to said further input of said frequency changing means to control the output frequency thereof, said stations being interconnected such that the output frequency of the frequency changing means of any one station is determined at at least one other station and applied to the comparison means at each such other station and the output frequency of the frequency changing means at each said other station is determined at said one station and applied to the comparison means at said one station.

Said fixed frequency alternating current generator may have a three phase output and said frequency changing means may comprise an alernator having a rotor and three phase stator windings to which the output of said generator is applied, and a motor for driving said rotor, said further input being applied to said motor to control the speed thereof. Alternatively, said frequency changing means may comprise a three phase variable capacitor having a rotatable plate eccentrically mounted for rotation between a single circular plate and three fixed equal segmental plates together forming a circular plate, the three phases of the output of said generator being applied to said three segmental plates, and a motor for driving said rotatable plate, said further input being applied to said motor to control the speed thereof.

Said comparison means at one station may comprise for each other station to which said one station is connected a phase comparator for giving a direct current output proportional to the phase difference between the output of the frequency changing means of said one station and the output of the frequency changing means at said other station as determined at said one station, and summation means for algebraically summing the output of said phase comparators.

Also in accordance with the present invention a digital data link network includes a plurality of digital data centres interconnected by duplex data links, each data centre comprising a transmitter for transmitting digital data, a receiver for receiving digital data, a frequency standard having a fixed frequency approximately equal to the frequency of the frequency standard at each other data centre, frequency changing means to which the output of said frequency standard is applied and which gives an output frequency dependant on the frequency of the input from said frequency standard and a further input, the output frequency of said frequency changing means being applied to control the rate at which digital data is transmitted by said transmitter, comparison means for giving an output proportional to the difference in phase between the output of said frequency changing means ond the output of the frequency changing means, as determined at said data centre, of each other data centre to which said data centre is connected by a duplex data link, the output of said comparison means being applied to said further input of said frequency changing means to control the output frequency thereof.

The present invention will now be described by way of example with reference to the accompanying drawings in which.

Figure 1:
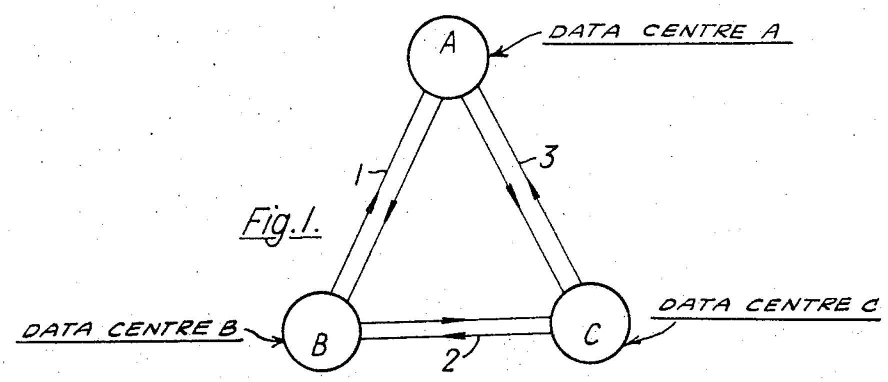
FIGURE 1 is a diagram of a digital data link network.
Figure 2:
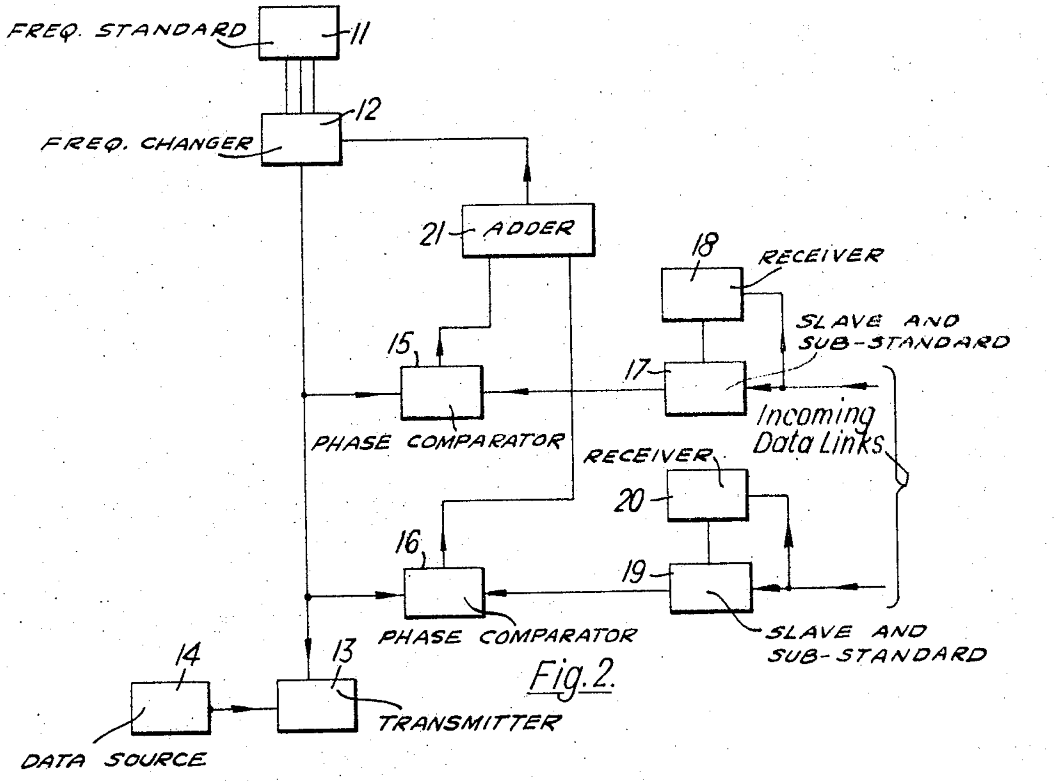
FIGURE 2 is a block diagram showing equipment located at each data centre shown in FIGURE 1 in accordance with the invention.

Referring now to the drawings, FIGURE 1 shows a simple digital data link network comprising three data centres A; B, C interconnected by means of duplex data links 1, 2, 3. FIGURE 2 shows the equipment provided at the data centre A. The equipment includes a three-phase sine-wave frequency standard 11 having its three-phase output connected to a frequency changing means 12 to be more fully described with reference to FIGURE 3. The single-phase output of the frequency changing means is applied to a transmitter 13 to control the rate at which digital data from a data source 14 is transmitted from the data centre. The output of the frequency changing means 12 is also applied to two phase comparators 15, 16. The other input to the phase comparator 15 is connected to one output of a slave frequency sub-standard 17 whose input is connected to the incoming data link from the data centre B and which reproduces the transmitting frequency of the data centre B. The other output of the sub-standard 17 is connected to a receiver 18 for receiving the digital data from the data centre B. Similarly, other input to the phase comparator 16 is connected to one output of a slave frequency substandard 19 whose input is connected to the incoming data link from the data centre C and which reproduces the transmitting frequency of the data centre C. The other output of the sub-standard 19 is connected to a receiver 20 for receiving the digital data from the data centre C. The outputs of the phase comparators 15 and 16 are connected as inputs to an adder 21, the output of which is connected to a further input to the frequency changing means 12.

Figure 3:
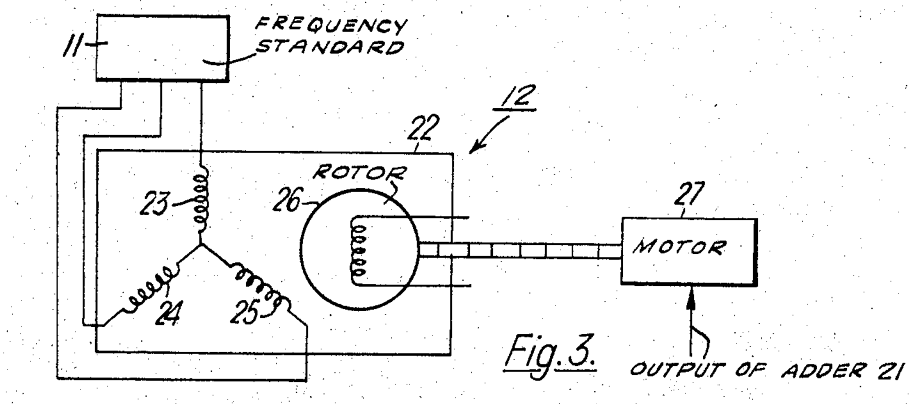
FIGURE 3 is a more detailed diagram of part of the equipment shown in FIGURE 2.

The frequency changing means 12 is shown in more detail in FIGURE 3 and comprises a three-phase alternator 22 having stator windings 23, 24, 25 to which the three phase outputs of the frequency standard 11 are connected. The alternator 22 also includes a rotor 26 mechanically coupled to the output shaft of a D.C. motor 27, the speed of which is controlled by the output from the adder 21 (FIGURE 2). The single-phase output of the frequency changing means 12 is taken from the winding of the rotor 26.

In operation of the frequency changing means, if a three-phase sine-wave having a frequency $f_n$ is applied to the stator windings 23, 24, 25 and if the rotor 26 is rotated at $f_s$ revolutions per second as the result of an input $v_n$ from the adder 21 to the D.C. motor 27, a single phase sine-wave of frequency $f_n+f_s$ will be generated in the winding of the rotor 26.

Figure 4:
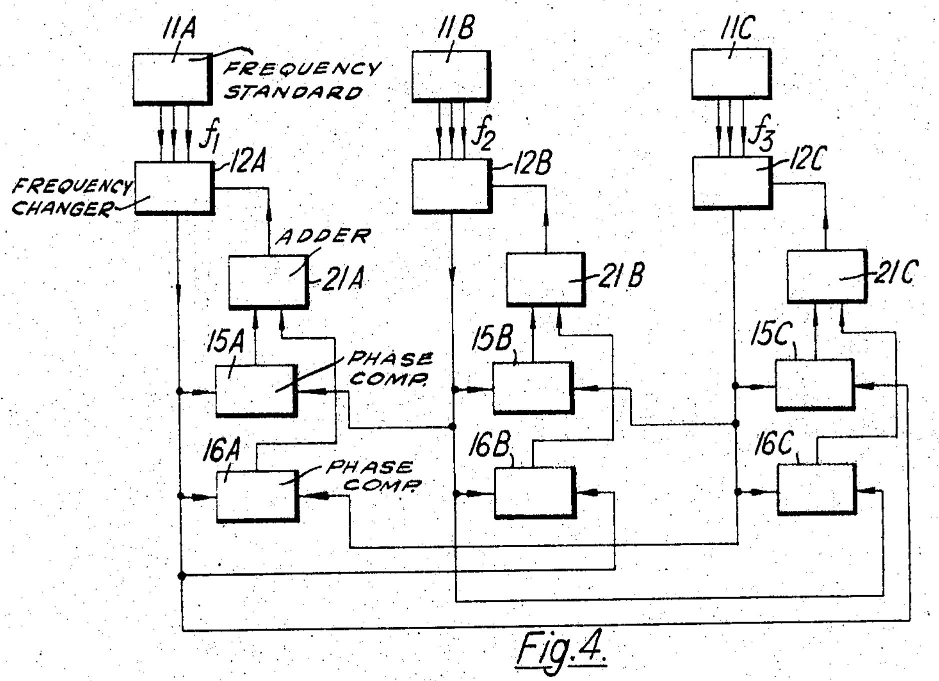
FIGURE 4 is a diagram showing interconnections between parts of the equipment at each data centre.

FIGURE 4 shows the interconnections between the data centres A, B and C. For the sake of clarity the transmitters, receivers and slave sub-standards have been omitted and the reference numerals have been given suffixes to indicate the appropriate data centre.

In operation, the frequency standards 11A, 11B and 11C generate sine-waves of different, but approximately equal frequencies. Considering the data centre A, if the rotor of the alternator of the frequency changing means 12A is stationary the sine-wave of frequency $f_1$ is applied to the phase comparators 15A and 16A. The other input to the comparator 15A is derived from the output of the frequency changing means 12B at the data centre B. The comparator 15A gives a D.C. output proportional to the phase difference between the output of the frequency changing means 12A and the output of the frequency changing means 12B as received at the data centre A. Similarly, the phase comparator 16A gives a D.C. output proportional to the phase difference between the output of the frequency changing means 12A and the output of the frequency changing means 12C as received at the data centre A. The D.C. outputs of the phase comparators 15A and 16A are added algebraically in the adder 21A, the output of which is applied to the D.C. motor of the frequency changing means 12A and causes a change in the output frequency from $f_1$ to $f_1+f_s$. This output is applied not only to the phase comparators 15A and 16A but also to the phase comparators 16B and 15C and therefore causes a changing in frequency of the outputs of the frequency changing means 12B and 12C. The whole system therefore acts as a closed loop servo and the system stabilises with the output frequencies of the frequency changing means 12A, 12B and 12C all equal to each other.

Although the output frequencies of the frequency changers 12A, 12B and 12C are all the same there will still be outputs from the phase comparators 15 and 16 at each data centre since the outputs from the slave substandards 17 and 19 will, in general, be out of phase with the output from the frequency changer 12.

It is not necessary for each data centre in the network to be directly connected to each other data centre. In FIGURE 1, for example, the duplex data link 3 could be omitted without affecting the frequency stabilization since any change in output frequency from the data centre A would cause a change in the output frequency of the data centre B which in turn would cause a change in the output frequency of the data centre C. The data centre A is thus indirectly connected to the data centre C, and in this specification the word "interconnected" includes such cases where the connections between some of the stations or data centres are indirect connections of this kind.

The system described above may be modified in many ways. For example, the output of the frequency changer 12 at any data centre may be transmitted directly to the other data centres in which case the slave sub-standards may be omitted at each data centre. Also, frequency changing means other than that described could be used. The frequency changer could, for example, comprise a three phase variable capacitor having a rotatable plate eccentrically mounted for rotation between a single circular plate and three fixed equal segmental plates together forming a circular plate. The rotatable plate has a heart-like shape expressed by the polar co-ordinate equation $$r=\tfrac{1}{2}(a+b)+(a-b)\cos\theta$$

and is rotated about an axis through the origin of coordinates and perpendicular to the plane of the plate. The three phases of the output of the frequency standard 11 are connected to the three segmental plates, and a D.C. motor for driving the rotatable plate is provided, the speed of the motor being controlled by the output of the adder 21 as described above.

For simplicity the system described above has been shown as having only three data centres but the system is suitable for use with any number of data centres. Furthermore, spur data centres may also be connected to the network provided that the data link connecting the spur data centre to the network is a one way link from the network to the spur data centre.

Although the system has been described with reference to a digital data link network the stabilising system is suitable for use with any other system in which it is required to obtain a single operating frequency from a plurality of separate frequency sources without relying on the operation of a single station.

What I claim is:

1. A frequency stabilizing system including a plurality of stations each comprising a fixed frequency alternating current generator the output frequency of which is approximately equal to the output frequency of the generator at each other station, frequency changing means to which the output of said generator is applied and which gives an output frequency dependant on the frequency of the input from said generator and a further input, comparison means for giving an output proportional to the difference in phase between the output of said frequency changing means and the output of the frequency changing means of at least one other of said stations, the output of said comparison means being applied to said further input of said frequency changing means to control the output frequency thereof, said stations being interconnected such that the output frequency of the frequency changing means of any one station is determined at at least one other station and applied to the comparison means at each such other station and the output frequency of the frequency changing means at each said other station is determined at said one station and applied to the comparison means at said one station.

2. A system as claimed in claim 1 in which said fixed frequency alternating current generator has a three phase output.

3. A system as claimed in claim 2 in which said frequency changing means comprises an alternator having a rotor including a rotor winding and three stator windings to which the three phase outputs of said generator are applied, and a motor for driving said rotor, said further input being applied to said motor to control the speed thereof.

4. A system as claimed in claim 1 in which said comparison means at said one station comprises for each other station to which said one station is connected a phase comparator for giving a direct current output proportional to the phase difference between the output of the frequency changing means of said one station and the output of the frequency changing means at said other station as determined at said one station, and summation means for algebraically summing the output of said phase comparators.

5. A digital data link network including a plurality of digital data centres interconnected by duplex data links, each data centre comprising a transmitter for transmitting digital data, a receiver for receiving digital data, a frequency standard having a fixed frequency approximately equal to the frequency of the frequency standard at each other data centre, frequency changing means to which the output of said frequency standard is applied and which gives an output frequency dependant on the frequency of the input from said frequency standard and a further input, the output frequency of said frequency changing means being applied to control the rate at which digital data is transmitted by said transmitter, comparison means for giving an output proportional to the difference in phase between the output of said frequency changing means and the output of the frequency changing means, as determined at said data centre, of each other data centre to which said data centre is connected by a duplex data link, the output of said comparison means being applied to said further input of said frequency changing means to control the output frequency thereof.

6. A digital data link network as claimed in claim 5 in which said comparison means at any one data centre comprises for each other data centre to which said one data centre is connected by a duplex data link a phase comparator for giving a direct current output proportional to the phase difference between the output of the frequency changing means of said one data centre and the output of the frequency changing means at said other data centre as determined at said one data centre, and summation means for algebraically summing the output of said phase comparators.

7. A digital data link network as claimed in claim 6 in which said frequency standard has a three phase output.

8. A digital data link network as claimed in claim 7 in which said frequency changing means comprises an alternator having a rotor including a rotor winding and three stator windings to which the three phase outputs of said frequency standard are applied, and a motor for driving said rotor, said further input being applied to said motor to control the speed thereof.

References Cited

UNITED STATES PATENTS

| | | | |
|---|---|---|---|
| 2,435,259 | 2/1948 | Wilder et al. | 343—179 X |
| 3,128,465 | 4/1964 | Brilliant. | |
| 3,182,128 | 5/1965 | Legler. | |

ROBERT L. GRIFFIN, *Primary Examiner.*

BENEDICT V. SAFOUREK, *Assistant Examiner.*

U.S. Cl. X.R.

178—69.5; 325—58